United States Patent [19]

Leeuwen

[11] Patent Number: 5,027,848
[45] Date of Patent: Jul. 2, 1991

[54] PRESSURE INDICATING VALVE STEM

[76] Inventor: Johannes V. Leeuwen, 9 Wingadee St., Lane Cove, New South Wales 2066, Australia

[21] Appl. No.: 590,019

[22] Filed: Sep. 28, 1990

Related U.S. Application Data

[63] Continuation-in-part of Ser. No. 449,829, Dec. 5, 1989, abandoned.

[51] Int. Cl.[5] .................. B60C 23/04; B60C 29/00
[52] U.S. Cl. ................... 137/227; 73/146.8; 116/34 R
[58] Field of Search ............ 137/227; 73/146.2, 146.3, 73/146.8; 152/431; 116/34 R

[56] References Cited

U.S. PATENT DOCUMENTS

| 1,582,523 | 4/1926 | Larson et al. ............ 137/227 |
| 1,755,163 | 4/1930 | Pulverman ............ 137/227 X |
| 3,230,968 | 1/1966 | Struby ............ 137/227 |
| 3,650,150 | 3/1972 | Eccles, Jr. ............ 73/146.8 |
| 3,792,677 | 2/1974 | Frost ............ 137/227 X |
| 3,906,988 | 9/1975 | Mottram ............ 137/227 |
| 4,103,549 | 8/1978 | Schmidt ............ 73/146.8 |
| 4,310,014 | 1/1982 | Parker ............ 137/227 |
| 4,606,391 | 8/1986 | Achterholt ............ 152/431 |

FOREIGN PATENT DOCUMENTS 416319 11/1946 Italy ............ 137/227

Primary Examiner—John Rivell
Attorney, Agent, or Firm—Thomas A. Meehan; Willian, Brinks, Olds, Hofer, Gilson & Lione

[57] ABSTRACT

A pressure indicating valve stem for a pneumatic tubeless tire comprises a tubular valve core holder (5), a mounting sleeve (4) in which the core holder is capable of elastically restrained telescopic movement, a clamp nut threaded on said sleeve which in conjunction with an end flange (9) on the sleeve secures it within the valve orifice of a wheel rim, and sealing means comprising an elastomeric generally tubular molding having an annular margin (14) clamped between the end flange and the rim and its other end margin sealed to the inner end of the core holder. The molding has a large diameter undulating walled boot or bellows (19) extending from one said end margin to the other, which provides all of the elastic restraint on the movement of the core holder within the sleeve.

14 Claims, 3 Drawing Sheets

PRESSURE INDICATING VALVE STEM

CROSS-REFERENCE TO RELATED APPLICATION

This application is a continuation-in-part of my co-pending application Ser. No. 07/449,829, filed Dec. 5, 1988 now abandoned.

FIELD OF THE INVENTION

This invention relates to valves for the inflation of tubeless pneumatic tires for motor vehicles and other wheeled equipment. Such valves are currently available in two configurations, known respectively as "snap-in" and "clamp-in" valves.

BACKGROUND OF THE INVENTION

Both types of tire valve comprise a central valve core, which itself comprises a valve body incorporating a seat and a spring-loaded valve element co-acting with that seat, screwed as a plug into a tubular core holder. The valve core is a replaceable item and it and the core holder have become standardized throughout the world insofar as their cross-sectional dimensions are concerned.

In the case of snap-in valves the core holder is bonded to an elastomeric outer base so shaped that, on insertion into the valve aperture in the rim of a conventional vehicle wheel, its retention in, and airtight seal with the rim, is effected. In the case of the clamp-in type, the core holder is flanged at its lower end, threaded externally and by means of a rubber grommet, rubber and metal washers and clamping nut, may be secured airtightly in the rim's valve aperture. In each case the core holder and associated components referred to, except for the core, are known as a valve stem.

It is well known that tire life and vehicle safety depend largely on tires being maintained at the recommended inflation pressure, which varies with the vehicle-tire combination, tire location on the vehicle and operating conditions.

Thus gauges are available which may be applied to the open upper end of the core holder of a tire valve which, by depressing the spring-loaded valve element of the valve core, become pressurised and indicate the pressure in the tire.

It is also well known that such gauges often become inaccurate with use, that motorists frequently take a risk on their vehicle's tire pressures being correct rather than go to the trouble of finding and using a gauge, and that occasionally a sealed valve commences to leak following the disturbance caused by use of a gauge.

DESCRIPTION OF THE PRIOR ART

Thus, various proposals have been suggested for the provision of valve stems which include built-in devices for indicating whether or not the tire is correctly inflated. For the most part such prior proposals have included spring loaded pistons sliding in cylinders exposed to the air pressure within the tire. The correctness or otherwise of the pressure is then indicated by the position of the piston working against the effect of the loading spring. Those proposals have been unsatisfactory because the components additional to those of a standard non-indicating stem, for example, the loading spring, have increased the manufacturing and assembly costs, and the tendency for seals either to leak or to seize up has caused them to be unreliable. The indicating valve of U.S. Pat. No. 3,906,988 overcomes the sealing problem by utilizing a pliable or flexible diaphargm instead of a cylinder but still incorporates a loading spring.

One proposal which eliminates springs and utilizes an annular resilient diaphragm to control the position of an indicator element is shown in FIGS. 9 and 10 of U.S. Pat. No. 3,230,968 to Struby. Applicant found when developing the present invention that simple diaphragms of the type shown in those figures were unsatisfactory for a number of reasons. Generally speaking the response is of inadequate magnitude, non-linear and, at least in the case of "clamp-in" valves, is adversely and variably affected by adventitious distortions of the elastomeric components due to variations in the clamping forces applied when the valve is being assembled to a wheel and the tire inflated.

Other prior proposals have provided a screw-on cap with a pressure indicating capability. Such expedients are also unsatisfactory because the cap, being a separate exposed component, is exposed to damage, loss, and, more importantly, theft.

U.S. Pat. No. 3,650,150 to Eccles discloses a device including an external cap, which is, therefore, at least to some extent, subject to the disadvantages of the cap devices mentioned above, which uses an elastomeric bellows to control the movement of the pressure indicating component. However, the Eccles bellows necessarily has an outer diameter on a par with that of the tip of a standard core holder, and Applicant has found that such small diameter bellows, if of reasonable length, cannot provide a response of sufficient magnitude to allow of accurate reading of the indicated pressure.

Other prior art disclosures known to Applicant but thought to be less relevant to the invention are U.S. Pat. Nos. 4,310,014; 4,103,549; and 4,606,391.

SUMMARY OF THE INVENTION

An object of the present invention is to provide a pressure indicating tire valve stem of the internal type, that is to say wherein the operative components are safely located within the stem or the tire interior, which provides a continuous, visible, reliable indication of the correctness or otherwise of a tire's inflation pressure by particularly simple means, incurring very little additional material cost by comparison with a standard non-indicating stem, and fewer assembly steps in manufacture by comparison with known indicating stems of that type incorporating pistons and/or loading springs.

The invention achieves that object by utilizing elastomeric components, preferably different parts of a one piece elastomeric molding, which function as the seal between the stem and the wheel rim, the seal between the relatively moving parts of the stem, and the means providing a yieldable restraining force on one of those parts.

A further object of the invention is to provide such a stem wherein the active portion of the sealing means controlling that movement is isolated from a wheel rim sealing portion, so that stresses in, and deformation of, the latter do not materially affect the operation of the former.

A still further object of the invention is to provide such a stem wherein the active part of the sealing means is in the nature of a bellows whereof the outer diameter is appreciably more than that of the tip of a standard core holder, to enable the bellows movement to provide a response of sufficient magnitude to enable the pressure indication to be read to an adequate degree of accuracy.

The invention is in a pressure indicating, inflation valve stem for a tubeless pneumatic tire comprising a tubular, rigid, valve core holder, a rigid mounting sleeve in which said holder is capable of elastically restrained telescopic movement, affixture means, which, in use, secure said mounting sleeve within a valve aperture in a wheel rim, and sealing means comprising a static part providing an air-tight seal between said sleeve and the wheel rim and an active part providing a yieldable air-tight connection between said sleeve and an end of said holder protruding from said sleeve; said active part having an outer diameter greater than that of the tip of said holder and providing all of the elastic restraint on said holder, said sleeve having a peripheral end flange engaging said sealing means between said parts to isolate one from the other and ensure that relative movement between the sleeve and holder is wholly controlled by said active part of the sealing means.

In preferred embodiments the active part of the sealing means is in the form of a bellows engaged at one end by the said flange on said sleeve, moreover a similar diameter flange on said holder preferably engages the other end of the bellows, providing for similar end conditions for the bellows and direct compression of the bellows between those flanges. This enhances the magnitude, linearity and accuracy of the response of the device to variations of air pressure within the tire.

DESCRIPTION OF THE PREFERRED EMBODIMENTS

Figure 1:
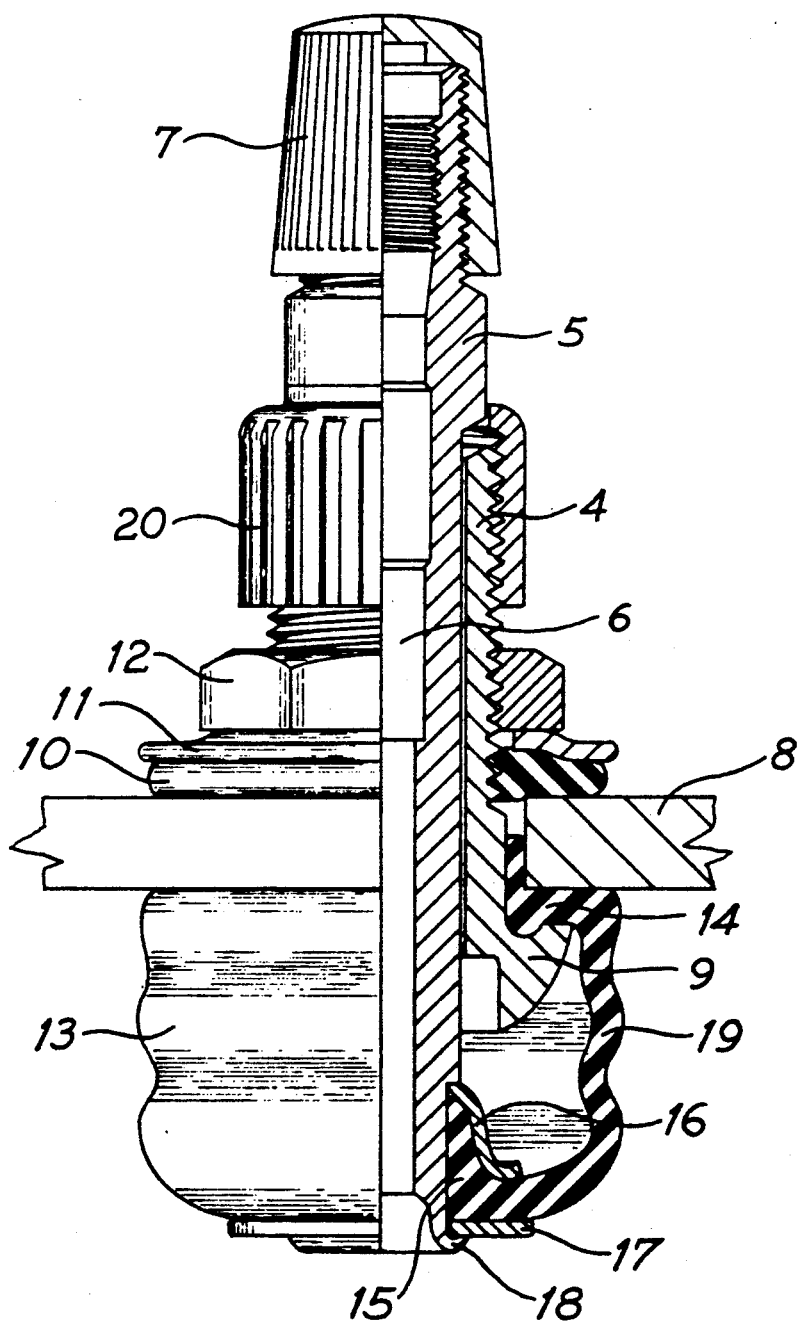
FIG. 1 is a quarter-sectioned side elevation of a tubeless, pneumatic tire valve stem according to an embodiment of the invention, drawn to an enlarged scale.

The valve stem illustrated by FIG. 1 is of the "clamp-in" type. It comprises a rigid plastic or metal mounting sleeve 4 in which a rigid valve core holder 5 is able to move axially to and fro. An air passage 6 extends axially through the holder 5 which is machined to take a standard valve core (not shown). The holder 5 is externally threaded at its outer end to take a dust cap 7.

Affixture means are furnished to secure the sleeve 4 within a valve aperture in a wheel rim 8. Those affixture means comprise a radially projecting flange 9 on the sleeve 5, an elastomeric washer 10, a rigid washer 11 and a clamp nut 12.

In this embodiment the sealing means comprise a resilient, elastomeric, generally tubular boot 13.

One end margin 14 of the boot 13 is clamped (when the nut 12 is tightened) between the flange 9 and the margin of the wheel rim 8 encircling the valve aperture therein and thus makes air-tight sealing contact therewith.

The other end margin 15 of the boot 13 is sealed to the end of the holder 5 projecting from the sleeve 4. It is clamped between a hat washer 16 and a plain washer 17 functioning as a flange on the holder 5 and held thereto as a fixed assembly by a swaged over rim 18 on the adjacent end of the holder 5.

The main body wall 19 of the boot 13, extending from the margin 14 sealed against the rim 8 to the margin 15 sealed to the holder 5, is of undulating shape with an outer diameter at least twice that of the tip of the holder 5 and may deform substantially in response to axial loadings on the boot 13. Thus, internal tire pressure may cause the holder 5 to move outwardly in the sleeve 4 against a restoring reaction force equal to the force needed to deform or compress the wall 19.

In accordance with the invention the wall 19 is stiff enough to provide all of the elastic restraint on the movement of the holder 5 within the sleeve 4 in response to inflation pressure changes within the tire.

Therefore, in this embodiment the boot margin 14 constitutes the static part of the sealing means and the boot wall 19 constitutes the active part. The flange 9 not only functions as part of the affixture means but also isolates those parts, ensuring that all clamping stresses are applied to the edge margin 14, leaving the wall 19 unaffected.

As indicated above, the extent to which the holder 5 projects from the exposed outer end of the sleeve 4 is a measure of the tire inflation pressure.

In simple embodiments, intended for use in relation to a single predetermined correct inflation pressure, three colour coded rings or the like on the core holder, where it protrudes from the mounting sleeve, may indicate whether the tire is under-inflated, correctly inflated (to the nominal pressure concerned) or over-inflated, depending on which ring is level with the outer end of the sleeve, but in the FIG. 1 embodiment provision is made to enable it to be set for use with any one of a predetermined range of correct pressures. To that end, the sleeve 4 is furnished with a ring-nut 20 which may be advanced or retracted to provide for adjustment of the effective length of the sleeve. The core holder 5 may be marked with a single indicium, and following an initial inflation of the tire to its correct pressure, the ring-nut 20 may be positioned so that its rim coincides with the indicium. Thereafter any change in pressure will be indicated by the departure of that indicium from its position of coincidence with the rim of the nut 20.

Figure 2:
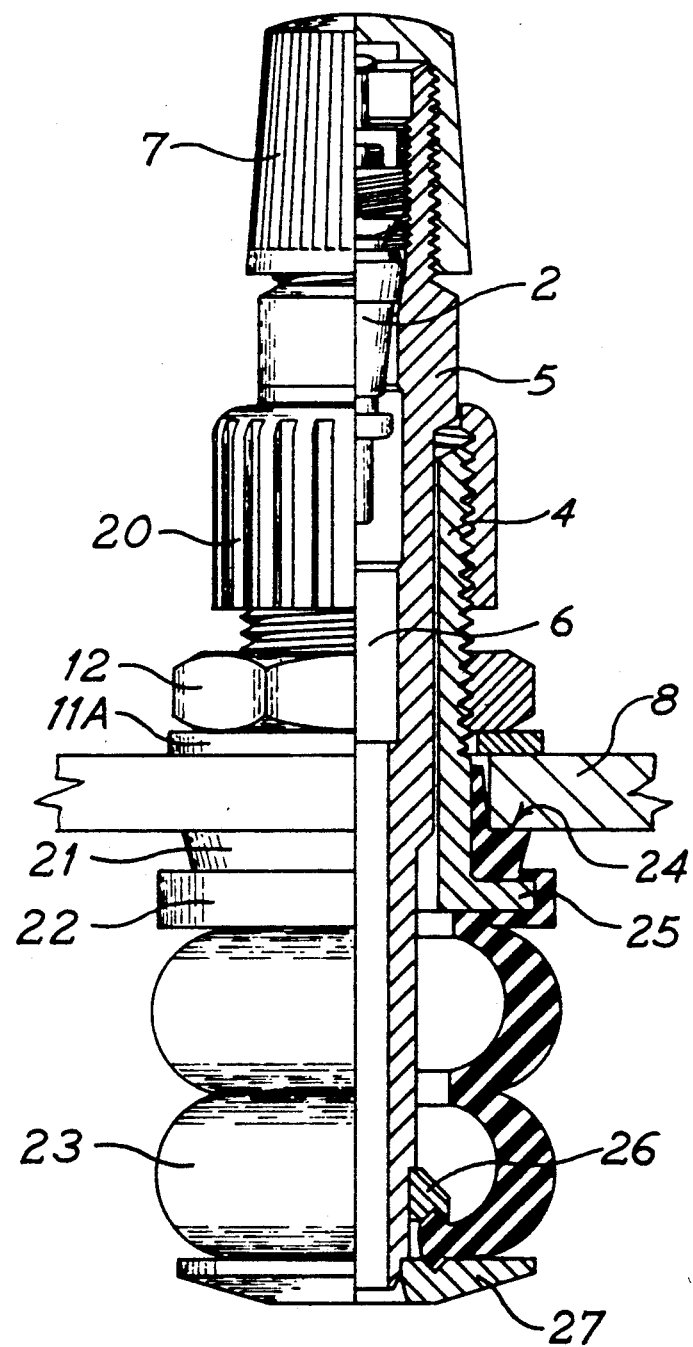
FIG. 2 is a view similar to FIG. 1 of a second embodiment of a valve stem according to the invention.

The FIG. 2 embodiment is also a clamp-in stem and is similar to the FIG. 1 embodiment. Those components which correspond in shape and function with components of the FIG. 1 embodiment are correspondingly numbered but not otherwise described. In this figure, a standard valve core 2 is shown in situ in the core holder 5, and the elastomeric and rigid washers 10 and 11 of the FIG. 1 embodiment are replaced by an anti-friction washer 11A.

The sealing means of the FIG. 2 embodiment are constituted by a one-piece elastomeric molding comprising a static part in the form of an annular collar 21, an intermediate part 22 and an active part in the form of a bellows 23. The collar 21 has a shoulder face 24 which is brought into air-tight pressure contact with the wheel rim 8 by the tightening of the clamp nut 12.

The sleeve 4 has a peripheral flange 25 at its inner end, corresponding to flange 9 of the FIG. 1 embodiment, but in this instance embedded in the intermediate part 22 of the sealing means.

The bellows 23 extends from the intermediate part 22 to near the inner end of a core holder 5 where its inner periphery is air-tightly gripped between an abutment 26 and a flange 27 fixed to the holder 5. Thus it will be apparent that internal tire pressure may cause the holder 5 to move outwardly in the sleeve 4 against a restoring reaction force equal to the force needed to compress the bellows 23.

It should be noted that the engagement of the intermediate part 22 of the sealing means by the flange 25 effectively isolates the bellows 23 from the collar 21, so that the stresses in the bellows 23 are unaffected by any agency other than the inflation pressure acting on the effective net cross-sectional area of the holder 5, where it extends through the wheel rim 8. It should also be noted that the flange 27 is substantially the same diameter as the flange 25 and that both those components have opposing flat faces normal to the axis of the holder 5. Both of these factors ensure that in use the bellows 23 are in substantially pure compression, which markedly contributes to the operational accuracy of the device as a whole.

It will also be noted that the outer diameter of the bellows 23 is more than twice that of the tip of the holder 5.

Figure 3:
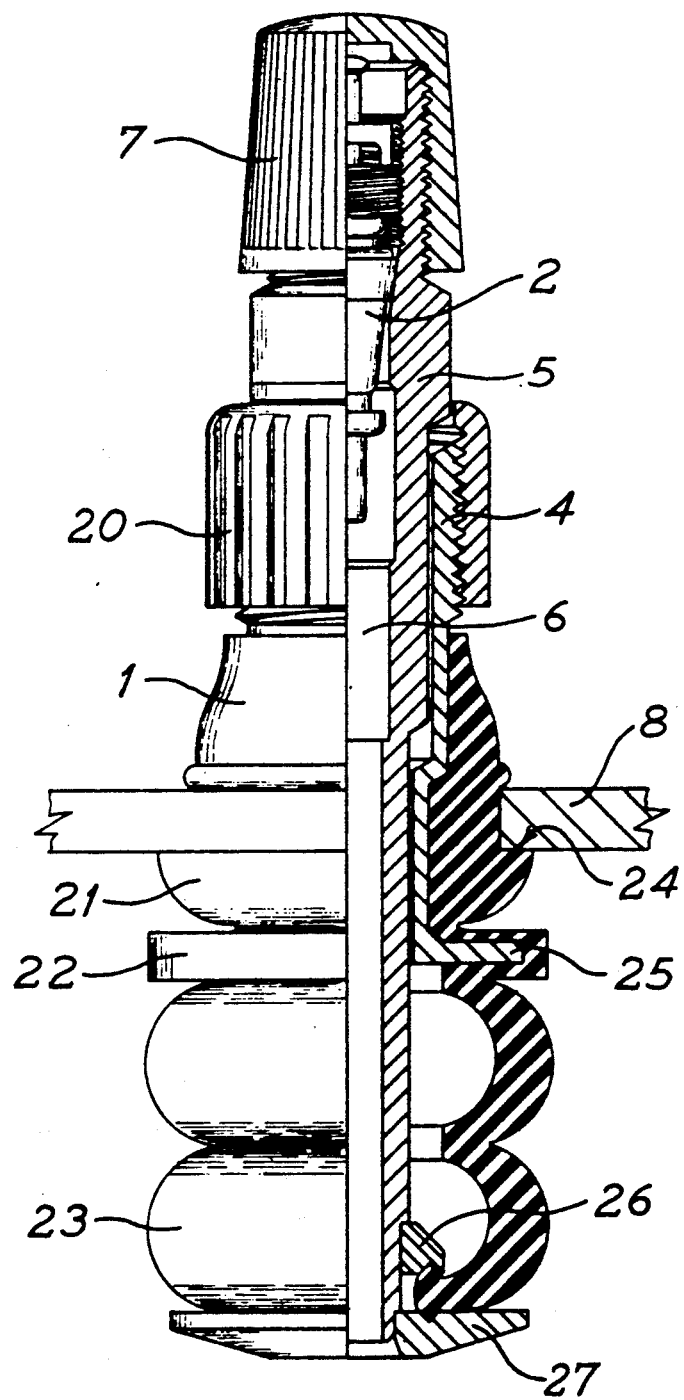
FIG. 3 is a view similar to FIG. 1 of a third embodiment of a valve stem according to the invention.

The FIG. 3 embodiment is also very like the FIGS. 1 and 2 embodiments, and once again corresponding parts are correspondingly referenced. However, this embodiment is a "snap-in" stem furnished with resilient rubber affixture means 1 of conventional shape, including a cylindrical neck which fits neatly through a clearance hole in a wheel rim 8, and a retaining head 21, which also functions as the static part of the sealing means. The affixture means 1 is bonded to and surmounted by the sleeve 4.

Thus the sealing means of the embodiment of FIG. 3 comprises a static part, being the head 21 with its sealing surface 24, an active part, being the bellows 23, and an intermediate part 22.

Although the best mode contemplated by the inventor for carrying out the present invention as of the filing data hereof has been shown and described herein, it will be apparent to those skilled in the art that suitable modifications, variations, and equivalents may be made without departing from the scope of the invention, such scope being limited solely by the terms of the following claims.

I claim:

1. A pressure indicating, inflation valve stem for a tubeless pneumatic tire, said valve stem comprising a tubular, rigid, valve core holder, a rigid mounting sleeve in which said holder is capable of elastically restrained telescopic movement, affixture means, which, in use, secure said mounting sleeve within a valve aperture in a wheel rim, and sealing means comprising a static part providing an air-tight seal between said sleeve and the wheel rim and an active part providing a yieldable air-tight connection between said sleeve and an end of said holder protruding from said sleeve; said active part having an outer diameter greater than that of a tip of said holder and providing all of the elastic restraint on said holder, said sleeve having a peripheral sleeve end flange engaging said sealing means between said parts to isolate one from the other and ensure that relative movement between the sleeve and holder is wholly controlled by said active part of the sealing means.

2. A valve stem according to claim 1 of the clamp-in type, further characterised in that said sealing means is a generally tubular elastomeric boot with one end margin secured air-tightly to said core holder and its other end margin secured air-tightly to said affixture means.

3. A valve stem according to claim 1 wherein said sleeve end flange is embedded in an intermediate part of said sealing means.

4. A valve stem according to claim 1 wherein said active part of said sealing means is a compressible bellows.

5. A valve stem according to claim 4 wherein said bellows is compressed between said sleeve end flange and a holder end flange on the inner end of said holder.

6. A valve according to claim 5 wherein both said end flanges are of substantially the same diameter.

7. A valve stem according to claim 1 wherein said sleeve is externally threaded and is furnished with a ring nut which may be advanced or retracted to adjust the effective length of the sleeve.

8. A valve according to claim 1 wherein said active part of said sealing means has an outer diameter at least twice that of the tip of said holder.

9. A valve according to claim 2 wherein said active part of said sealing means has an outer diameter at least twice that of the tip of said holder.

10. A valve according to claim 3 wherein said active part of said sealing means has an outer diameter at least twice that of the tip of said holder.

11. A valve according to claim 4 wherein said active part of said sealing means has an outer diameter at least twice that of the tip of said holder.

12. A valve according to claim 5 wherein said active part of said sealing means has an outer diameter at least twice that of the tip of said holder.

13. A valve according to claim 6 wherein said active part of said sealing means has an outer diameter at least twice that of the tip of said holder.

14. A valve according to claim 7 wherein said active part of said sealing means has an outer diameter at least twice that of the tip of said holder.

* * * * *